United States Patent [19]
Morita et al.

[11] Patent Number: 5,082,891
[45] Date of Patent: Jan. 21, 1992

[54] CURABLE RESIN COMPOSITION CONTAINING DISPERSED PARTICLES OF A CURED SILICONE RUBBER

[75] Inventors: Yoshitsugu Morita; Noriyasu Yokoyama; Keiji Yoshida, all of Chiba, Japan

[73] Assignee: Dow Corning Toray Silicone Co., Ltd., Tokyo, Japan

[21] Appl. No.: 450,692

[22] Filed: Dec. 13, 1989

Related U.S. Application Data

[63] Continuation-in-part of Ser. No. 317,368, Feb. 28, 1989, abandoned, which is a continuation-in-part of Ser. No. 234,242, Aug. 19, 1988, abandoned.

[30] Foreign Application Priority Data

Feb. 29, 1988 [JP] Japan ................................ 63-47215

[51] Int. Cl.$^5$ .............................................. C08K 5/01
[52] U.S. Cl. ..................................... 524/481; 524/277; 524/806; 524/860; 524/861; 524/448; 524/451; 524/437; 524/428; 524/786; 524/789; 524/785; 524/796; 524/779; 524/588; 525/446; 525/472; 525/476; 525/477; 525/403; 525/404
[58] Field of Search ............... 524/277, 806, 860, 861, 524/448, 451, 437, 428, 786, 789, 785, 796, 779, 588, 481; 525/446, 472, 476, 477, 403, 404

[56] References Cited

U.S. PATENT DOCUMENTS 4,743,670 5/1988 Yoshida et al. ....................... 528/15
4,778,860 10/1988 Morita et al. ........................ 525/431
4,880,882 11/1989 Morita et al. ........................ 524/277

FOREIGN PATENT DOCUMENTS 49-132141 12/1974 Japan.
52-014643 2/1977 Japan.
58-219218 12/1983 Japan.
59-096122 6/1984 Japan.

Primary Examiner—Melvyn I. Marquis
Attorney, Agent, or Firm—Robert Spector

[57] ABSTRACT

The curable resin composition of the present invention consists of a curable resin having uniformly dispersed therein particles of a cured silicone rubber obtained from an organosiloxane composition curable by a platinum-catalyzed hydrosilation reaction, wherein said organosiloxane composition contains reaction products of an ethylenically unsaturated epoxy compound and an ethylenically unsaturated aromatic compound with the organohydrogenpolysiloxane present in said organosiloxane composition. Either or both of the epoxy compound and the aromatic compound can be prereacted with a portion of the silicon-bonded hydrogen atoms of the organohydrogenpolysiloxane.

4 Claims, No Drawings

CURABLE RESIN COMPOSITION CONTAINING DISPERSED PARTICLES OF A CURED SILICONE RUBBER

REFERENCE TO COPENDING APPLICATIONS

This application is a continuation-in-part of copending application Ser. No. 07/317,368, filed on Feb. 28, 1989, now abandoned, which is, in turn, a continuation-in-part of application Ser. No. 234,242, filed on Aug. 19, 1988, and now abandoned.

BACKGROUND OF THE INVENTION

1. Field of the Invention

This invention relates to a curable resin composition. More particularly, this invention relates to a curable resin composition containing uniformly dispersed and finely divided particles of a silicone rubber. The composition exhibits improved flow properties during molding, and converts to a cured material exhibiting excellent flexibility, a low thermal expansion coefficient, a low mold shrinkage ratio and excellent adhesion between the resin matrix and dispersed silicone rubber particles.

2. Description of the Prior Art

Cured compositions based on organic and silicone resins have excellent electrical properties, including dielectric properties, volume resistivity, dielectric breakdown strength, and excellent mechanical properties that include flexural strength, compression strength, and impact strength. These properties make the compositions particularly desirable for use as insulating materials for various types of electric and electronic components.

The curable resin compositions can be fabricated by transfer molding, injection molding, potting and casting. The compositions can be applied to substrates by powder coating, immersion coating or dipping.

Cured resins prepared using the aforementioned compositions are generally rigid. When these resins are used, for example, to seal an electric or electronic component, large mechanical stresses are imparted to the internal elements of the component during the heating required to seal the component and post-cure the resin or the thermal cycling to which the component is subjected during testing and use. As a consequence, the element may not function properly or failure may occur in part of the element. One cause of the stresses and resultant failures is the difference in thermal expansion coefficient and post-molding shrinkage ratio between the elements of electric and electronic components and curable resins. The elements of electric and electronic components have very low thermal expansion coefficients and shrinkage ratios while the resins have large values for these ratios.

These differences between the thermal expansion coefficients and shrinkage ratios of the resin and the coated component also result in the formation of cracks in the cured resin coating and gaps between the component and the resin. The infiltration of water and other undesirable materials into these gaps contributes to deterioration and subsequent failure of the elements comprising the components.

Most previous attempts to modify curable resin compositions have not had as their objective a reduction in the thermal expansion coefficient or post-molding shrinkage ratio of the cured resins. For example, Japanese Patent Publication Number 13241/49, published on Dec. 18, 1974 relates to an improvement in the lubricating properties of the surfaces of resin moldings achieved by the addition of an organosilsesquioxane powder to curable phenolic resin compositions.

Japanese Patent Application Laid Open [Kokai] Number 52-14643 [14,643/77], published on Feb. 3, 1977, relates to an improvement resistance of silicone resin to abrasion by metals. This improvement is obtained by filling the synthetic curable resin with finely divided particles obtained from a cured material based on a organopolysiloxane and an inorganic filler. The thermal expansion coefficient, post-molding shrinkage ratio, and flexural modulus are unsatisfactory in both of the aforementioned resin compositions following curing.

In Japanese Laid Open Patent Application Number 58-219218 [219,218/83], published on Dec. 20, 1985 the present inventors propose a solution to the problems described in the preceding paragraph by adding to the curable resin a cured material containing at least 10 weight % of a straight-chain siloxane fraction. The material is reduced to a finely divided, i.e. microparticulate, form following curing. However, the problem with this approach that it is not always easy to reduce an elastomeric cured material to the desired small particle size.

The present inventors in Japanese Laid Open Patent Application Number 59-96122 [96,122/84], published on June 2, 1984 disclose preparing spherical cured particles by spraying a curable elastomer composition into a current of heated air. This method is quite excellent although expensive, due to the cost of the equipment required to produce the spherical particles of cured rubber.

U.S. Pat. No. 4,743,670, which issued to K. Yoshida et al. on May 10, 1988 describes a method for preparing a powdered form of silicone rubber by forming a dispersion of a liquid silicone rubber in surfactant-free water at a temperature of from 0 to 25 degrees C. and then mixing this dispersion into water at a temperature greater than 25 degrees C. Organic resin compositions containing these particles are less than satisfactory with respect to certain properties, particularly the infiltration of moisture into the cured resin. U.S. Pat. No. 4,778,860, which issued to two of the present three inventors on Oct. 18, 1988 attempts to solve these problems, by adding to the curable silicone rubber composition an aromatic hydrocarbon compound containing a substituted benzene ring where the substituent is a monovalent ethylenically unsaturated hydrocarbon radical or an alkenyloxy radical. This approach is not totally successful.

The present inventors have now discovered that the dimensional stability and resistance to moisture infiltration exhibited by the resin compositions disclosed in the aforementioned U.S. Pat. No. 4,778,860 could be increased to acceptable levels by adding an ethylenically unsaturated epoxy compound and an ethylenically unsaturated aromatic compound to the curable rubber composition.

Accordingly, an objective of the present invention is to provide a curable resin composition which exhibits excellent flow properties during molding, which will neither stain the metal mold nor exude onto the surface of the cured material, has an excellent mold-releasability, and converts to a cured material having excellent flexibility, a low thermal expansion coefficient, and a low mold shrinkage ratio.

SUMMARY OF THE INVENTION

The objectives of this invention are achieved by incorporating into the curable resin composition a dispersed phase of a finely divided cured silicone rubber that exhibits excellent compatibility with and adhesion to the cured resin. The organosiloxane composition used to prepare the cured silicone rubber particles is curable by a hydrosilylation reaction and contains reaction products of the organohydrogensiloxane used to cure the organosiloxane composition with 1) an ethylenically unsaturated epoxy compound and 2) an ethylenically unsaturated aromatic compound.

Before being combined with the other ingredients of the compositions used to prepare the cured silicone rubber particles, one or both of the epoxy compound and the aromatic compound can be prereacted with a portion of the organohydrogenpolysiloxane that is used to cure the organosiloxane composition.

DETAILED DESCRIPTION OF THE INVENTION

This invention provides an improved curable resin composition comprising
  (I) 100 parts by weight of a curable resin selected from the group consisting of phenolic resins, formaldehyde resins, xylene resins, xylene/formaldehyde resins, ketone/formaldehyde resins, furan resins, urea resins, imide resins, melamine resins, alkyd resins, unsaturated polyester resins, aniline resins, sulfonamide resins, silicone resins, epoxy resins, and copolymers obtained by reacting two or more of these resins, and
  (II) from 0.1 to 100 parts by weight of uniformly dispersed, finely divided particles of a cured silicone rubber exhibiting a particle diameter not exceeding 1 millimeter, the particles having been prepared by curing an organosiloxane composition comprising
    (A) 100 parts by weight of an organopolysiloxane having at least two silicon-bonded lower alkenyl groups in each molecule,
    (B) from 0.3 to 100 parts by weight of an organohydrogenpolysiloxane having at least two silicon-bonded hydrogen atoms in each molecule, and
    (C) an amount of a platinum-containing catalyst sufficient to promote curing of said silicone rubber.

The improvement comprises the presence in the curable organosiloxane composition of either
  (1) from 0.1 to 50 parts by weight of (D) an aliphatically unsaturated epoxide compound or a reaction product of from 0.1 to 50 parts by weight of said epoxide compound with a quantity of said organohydrogenpolysiloxane in excess of that required to react with said organopolysiloxane; and from 0.1 to 100 parts by weight of (E) an aromatic hydrocarbon containing at least one aliphatically unsaturated group per molecule or a reaction product of said aromatic hydrocarbon with a quantity of said organohydrogenpolysiloxane in excess of that required to react with said organopolysiloxane, or
  (2) a reaction product of from 0.1 to 50 parts by weight of said epoxide compound and from 0.1 to 100 parts by weight of said aromatic hydrocarbon with a quantity of said organohydrogenpolysiloxane in excess of that required to react with said organopolysiloxane.

The two ingredients of the present curable resin compositions will now be explained in detail.

I. The Curable Resin

The curable resin comprising ingredient (I) is the base material of the present resin composition, and a wide variety of curable resins known in the art can be used here. Examples of suitable resins include but are not limited to: formaldehyde resins, xylene resins, xylene/formaldehyde resins, ketone/formaldehyde resins, furan resins, urea resins, imide resins, melamine resins, alkyd resins, unsaturated polyester resins, aniline resins, sulfonamide resins, silicone resins, epoxy resins, and copolymers obtained by reacting two or more of these resins.

Phenolic, imide, epoxy, and silicone resins are preferred. It should be pointed out that silicone resins are typically brittle non-elastomeric hydrolysis reaction products of two or more organohalosilanes, and are a different class of materials from the finely divided cured silicone rubber particles the particles that constitute ingredient II of the present compositions.

Ingredient I can be a single resin or a mixture of two or more resins. Furthermore, ingredient I encompasses not only resins which cure by the application of heat with or without a curing catalyst, but also those resins curable by exposure to radiation, for example, ultraviolet and gamma radiation. To facilitate blending with the finely divided silicone rubber particles the uncured resin is preferably either a liquid at room temperature or melts below about 50° C.

In addition to the resin itself, curing agents, curing catalysts, photosensitizers, fillers, metal salts of higher fatty acids, ester waxes, plasticizers, and other additives and/or modifiers can be present.

II. The Cured Silicone Rubber Particle

The finely divided silicone rubber particles are prepared from an organosiloxane composition that cures by a platinum-catalyzed hydrosilylation reaction. The ingredients of this curable composition will now be described in detail.

The Organopolysiloxane (Ingredient A)

The organopolysiloxane identified hereinbefore as ingredient A is the principal ingredient of the curable material used to prepare the cured silicone rubber particles referred to herein as ingredient II. This ingredient can be any organopolysiloxane containing at least two silicon-bonded lower alkenyl groups in each molecule. The molecular configuration of this ingredient is preferably straight chain, however partially branched or network configurations are also permissible.

The viscosity of ingredient A at 25 degrees Centigrade can range from 10 centipoise (0.01 Pa.s) up to but not including that of a gum. The cured silicone rubber particles are brittle when the viscosity of ingredient A is below 10 centipoise, and it is difficult to prepare an emulsion when ingredient A is a gum. To avoid either of these difficulties the viscosity of ingredient A is preferably from 50 to 100,000 centipoise (0.05 to 100 Pa.s). A range of from 50 to 10,000 centipoise (0.05 to 10 Pa.s) is particularly preferred.

The organic groups bonded to the silicon atoms of the siloxane units in ingredient A are monovalent hydrocarbon or halogenated hydrocarbon groups. These groups can be identical or different. The groups are exemplified by but not limited to alkyl such as methyl, ethyl, propyl, and butyl; cycloalkyl such as cyclohexyl; lower alkenyl such as vinyl, and allyl; aryl such as phenyl and xylyl; aralkyl such as phenylethyl; and halogenated hydrocarbon such as gamma-chloropropyl and 3,3,3-trifluoropropyl.

The required lower alkenyl groups of ingredient A can be located anywhere within the molecule. These groups are preferably present on at least the terminal positions of the molecule, although not restricted to this location, and are preferably vinyl.

The terminal groups present on ingredient A are exemplified by triorganosiloxy groups such as trimethylsiloxy, dimethylvinylsiloxy, dimethylphenylsiloxy, methylvinylphenylsiloxy, hydroxyl groups and alkoxy groups.

Selection of the types of monovalent hydrocarbon groups in the siloxane units, the type of end-blocking group on the molecular chain, and the viscosity of ingredient A will be based on the intended use for the curable organosiloxane composition.

While the use of only straight-chain organopolysiloxane as ingredient A is preferred, the combination of a straight-chain organopolysiloxane and an organopolysiloxane resin is permitted.

The Organohydrogenpolysiloxane (Ingredient B)

The organohydrogenpolysiloxane is the crosslinking agent responsible for curing of organosiloxane composition used to obtain the cured silicone rubber particles. The composition cures by the reaction of a portion of the silicon bonded hydrogen atoms of ingredient B with the lower alkenyl groups of ingredient A under the catalytic activity of ingredient C.

The configuration of the organohydrogenpolysiloxane can be straight chain, cyclic or branched straight-chain, and this organohydrogenpolysiloxane can be a homopolymer or copolymer. It contains at least 2 silicon-bonded hydrogen atoms in each molecule and has a viscosity at 25° C. within the range of 1 to 10,000 centipoise (0.001 to 10 Pa.s). Linear or cyclic molecules are preferred.

The organic groups bonded to the silicon atoms of ingredient B are monovalent hydrocarbon and halohydrocarbon groups, as exemplified by methyl, ethyl, butyl, phenyl, and 3,3,3-trifluoropropyl. Methyl is particularly preferred among these.

Ingredient B typically provides from 0.5 to 5, preferably from 0.7 to 2 silicon-bonded hydrogen atoms for each silicon-bonded alkenyl group in ingredient A. Because ingredient B also reacts with ingredient D, an aliphatically unsaturated epoxide compound, and ingredient E, an aliphatically unsaturated aromatic compound, the concentration of ingredient B should be from 0.3 to 100 weight parts per 100 weight parts ingredient A.

As discussed in detail in subsequent portions of this specification, the reaction of ingredients B, D, and E can either occur after all of the ingredients of the organosiloxane composition have been combined or ingredient D and/or E can be prereacted with the portion of the organohydrogenpolysiloxane. The resultant mixture containing a sufficient quantity of unreacted silicon-bonded hydrogen atoms to cure the organosiloxane composition is then combined with the other ingredients of this composition.

The Platinum-Containing Catalyst (Ingredient C)

As used in this specification the term "platinum-containing catalyst" is intended to include platinum, other metals from the platinum group of the periodic table of the elements and compounds of these platinum group metals. Examples of suitable catalysts include but are not limited to finely divided elemental platinum, finely divided platinum dispersed on carbon powder, chloroplatinic acid, chloroplatinic acid/olefin coordination compounds, chloroplatinic acid/vinylsiloxane coordination compounds, tetrakis(triphenylphosphine)palladium, and rhodium catalysts.

The concentration of the platinum-containing catalyst is typically within the range of from 0.1 to 1,000, preferably 0.5 to 200 parts by weight, calculated as the metal, per 1,000,000 parts by weight of ingredient A.

The Aliphatically Unsaturated Epoxide Compound (Ingredient D)

The function of the aliphatically unsaturated epoxide compound is to increase the bonding or adhesion between the curable resin (ingredient I) and the finely divided particles of cured silicone rubber that constitute ingredient II. Any organic compound containing at least 1 aliphatically unsaturated group and at least 1 epoxy group in each molecule can be used as ingredient D. Examples of this ingredient include but are not limited to allyl glycidyl ether, vinylcyclohexene monoxide, glycidyl acrylate, glycidyl methacrylate, and compounds of the formulae

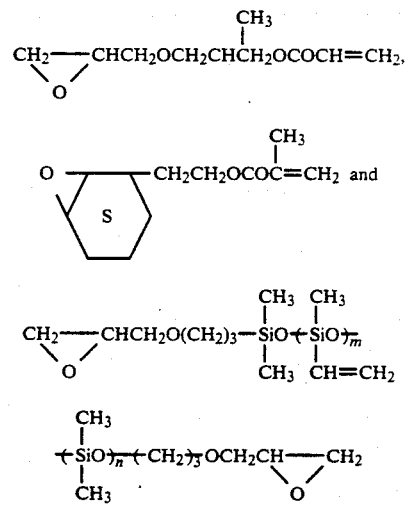

where m and n are positive integers.

The concentration of ingredient D can range from 0.1 to 50 parts by weight per 100 parts by weight of ingredient A.

In accordance with one embodiment of this invention ingredient D can be reacted with the stoichiometric excess of silicon-bonded hydrogen atoms in ingredient B before being combined with the other ingredients of the curable organosiloxane composition used to prepare the cured silicone rubber particles. This reaction is preferably conducted in the presence of a platinum-containing catalyst of the type described in this specification as ingredient C. The resultant reaction product replaces a mixture of ingredients B and D, and can be used in combination with ingredients A and C and E to prepare ingredient II. The term "stoichiometric excess" applies to additional silicon-bonded hydrogen atoms of ingredient B over and above the quantity required for reaction with ingredient A.

The Aliphatically Unsaturated Aromatic Compound

The aliphatically unsaturated aromatic compound (ingredient E) is the key component for improving the affinity between the curable resin (ingredient I) and the cured silicone rubber particles (ingredient II) when ingredient I is dispersed in ingredient II. Each molecule of ingredient E contains at least 1 aliphatically unsaturated group such as vinyl or allyl and at least 1 benzene ring.

Ethylenically unsaturated aromatic compounds that can be used as ingredient E include but are not limited to

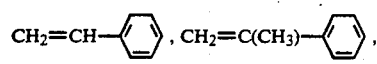

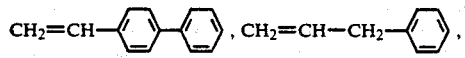

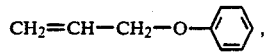

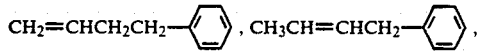

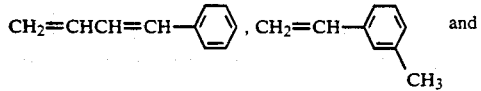

and

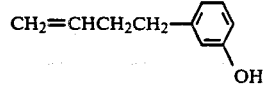

The concentration of ingredient E is typically from 0.1 to 100 weight parts per 100 weight parts of ingredient A. As described in the preceding section of this specification with respect to ingredient D, ingredient E can also be prereacted with a portion of the organohydrogenpolysiloxane, which is present in a stoichiometric excess relative to the amount required to react with the organopolysiloxane (ingredient A). The resultant mixture of reaction product and ingredient B containing unreacted silicon-bonded hydrogen atoms is then blended with the other ingredients of the curable organosiloxane composition used to prepare the cured silicone rubber particles (ingredient II).

Rather than reacting ingredients D and/or E individually with ingredient B, a mixture of ingredients B, D and E can be reacted, preferably in the presence of a platinum-containing catalyst. The resultant mixture of reaction products and ingredient B containing unreacted silicon-bonded hydrogen atoms is then added to the other ingredients of the curable organosiloxane composition used to prepare the cured silicone rubber particles.

Optional Ingredients

In addition to ingredients A through E discussed in the preceding specification, the cured silicone rubber particles used as ingredient II may contain a filler in order to adjust the fluidity and increase the mechanical strength of the molded product. Such fillers are exemplified by reinforcing fillers such as precipitated silica, fumed silica, calcined silica, and fumed titanium oxide, as well as by non-reinforcing fillers such as quartz powder, diatomaceous earth, asbestos, aluminosilicic acid, iron oxide, zinc oxide, and calcium carbonate.

These fillers can be used directly or following a surface treatment with an organosilicon compound such as hexamethyldisilazane, trimethylchlorosilane, or dimethylpolysiloxane.

So long as the objectives of the present invention are not compromised, the curable organosiloxane composition used to prepare ingredient II can contain small or very small quantities of acetylenic compounds, hydrazines, triazoles, phosphines, mercaptans, or other known curing reaction inhibitors. Other permissible additives include but are not limited to pigments, heat stabilizers, flame retardants, plasticizers, and organopolysiloxanes having 1 alkenyl group in each molecule, the latter for the purpose of reducing the modulus of the cured silicone rubber.

So long as the silicone rubber particles are cured by a hydrosilylation reaction, the method used to prepare these particles is not critical. For example, irregularly shaped particles of a cured silicone rubber can be obtained by first heating the curable organosiloxane composition in an oven to produce an elastomer, and then mechanically grinding the product with or without cooling, to form a powder.

An alternative method for preparing the cured silicone rubber particles comprises spraying a solution of the curable organosiloxane composition diluted using an organic solvent into a stream of heated air using a spray drier or similar device.

A second alternative method for preparing the particles comprises preparing a dispersion by gradually adding the curable organosiloxane composition to a volume of low-temperature water with stirring, optionally in the presence of a surfactant. This dispersion is then blended with water, another liquid, or a gas to produce spherical cured silicone rubber particles. The temperature of the medium used to cure the rubber is higher than the temperature of the dispersion.

Of the preceding alternative methods, the "wet" method whereby the dispersed organosiloxane composition is contacted with a heated liquid has been found to be advantageous based on ease of production and the ability of the method to mass produce particles of a cured silicone rubber. The medium into which the organosiloxane composition is initially dispersed can be non-aqueous or a miscible mixture of water and a non-aqueous liquid.

The particle diameter of the cured silicone rubber prepared using the methods described in the preceding paragraphs should generally not exceed 1 mm. Diameters not exceeding 300 microns are preferred for use in the present invention. Particularly in the case of spherical particles, diameters not exceeding 50 microns are particularly preferred from the standpoint of improving fluidity of the final curable resin composition during molding.

Furthermore, the spherical particles of cured silicone rubber may contain some modified forms, such as ovoids and ellipsoids.

It is essential that the cured silicone rubber particles be uniformly dispersed into the curable resin (ingredient I) of the present compositions.

The present compositions typically contain from 0.1 to 100 parts by weight of the cured silicone rubber particles (ingredient II) per 100 parts by weight of the curable resin. The beneficial effects imparted by ingredient II are not fully evident at concentrations below 0.1 part by weight, while the presence of more than 100 parts of the particles adversely affects the physical properties of the cured resin composition. The concentration of ingredient II is preferably from 0.5 to 70 parts by weight.

A homogeneous dispersion of the cured silicone rubber particles in the curable resin can be prepared using any of the known types of mixing devices.

The spherical or irregularly shaped particles of cured silicone rubber have an excellent affinity for the curable resin matrix and bond well to this matrix due to the presence of the unsaturated epoxide and unsaturated aromatic compounds. Moldings prepared using these curable resin composition characteristically have a lower infiltration or penetration by moisture than comparable moldings prepared using compositions containing prior cured silicone rubber particles, irrespective of the shape of the particles or the method used to prepare them.

Moldings formed from the present compositions characteristically have a higher flexibility, a lower thermal expansion coefficient, and exhibit less shrinkage.

The present compositions exhibit excellent flow properties during the molding operation.

All of the foregoing advantages make the present compositions particularly useful for preparing moldings requiring dimensional accuracy, and as sealants, casting agents, liquid coatings and powder coating for various electric and electronic components such as transistors, integrated circuits, diodes, thermistors, transformer coils and resistors.

The following examples are intended to describe preferred embodiments of the present invention and should not be interpreted as limiting the scope of the invention as defined in the accompanying claims. Unless otherwise specified all parts and percentages specified in the examples are by weight and viscosities were measured at 25 degrees C.

The properties of the cured materials were measured using the following standards and methods.

(1) Thermal expansion coefficient was determined using a sample that had been post-cured at 180 degrees Centigrade for 5 hours using the procedure described in ASTM test procedure D-696.

(2) Flexural modulus was determined by the flexural test method of JIS K-6911, which can be summarized as follows: The test samples were rectangular strips of cured material measuring at least 80 mm in length, 4±0.2 mm thick and 10±0.5 mm wide. The samples were supported at each end to form a span of equal to 16 times the thickness of the sample±0.5 mm. A gradually increasing load was applied to the center of the span, and the deflection of the test sample as a function of amount of loading was measured and plotted. The flexural modulus is equal to the slope of the resulting plot, expressed in units of kg(f)/mm.

(3) Mold shrinkage ratio was determined using test method described in JIS K-6911 on test samples prepared by compression molding the curable composition in a metal mold, post-curing according to the conditions in the particular example, and then cooling to room temperature. The test samples were circular in shape with an outer diameter of 90 mm. and a thickness of 5 mm. Each circular surface of the test sample contained a circular rim having an outer diameter of 80 mm., an inner diameter of 76 mm. and a height of 3 mm, the diameters being measured from the center of the test sample.

After being post cured the test samples were maintained at a temperature of 23°±2° C. and a relative humidity of 50±5% for 23-25 hours. The outer diameter of the rim on each side of the sample was measured in two orthogonal directions (a total of 4 measurements) and the outer diameters of the corresponding grooves in the mold used to form the test samples were measured in a similar manner.

The mold shrinkage (MS) of the samples was calculated using the following formula:

$$MS = \frac{1}{4}[(D_1-d_1)/D_1 + (D_2-d_2)/D_2 + (D_3-d_3)/D_3 + (D_4-d_4)/D_4] \times 100$$

where $D_{1-4}$ = outer diameter of mold grooves (4 measurements)

$d_{1-4}$ = outer diameter of rim on test sample (4 measurements)

(4) Spiral flow was measured according to the Epoxy Molding Materials Institute (EMMI) standard 1-66 on the curable composition prepared according to the conditions in the particular example.

(5) Scanning Electron Microscope (SEM) Observations: A photomicrograph of the fracture surface of the test specimen from the flexural modulus measurement was obtained using a scanning electron microscope. The micrograph was inspected to determine the adhesion between the cured silicone rubber particles and the resin, as evidenced by the presence or absence of gaps or voids.

(6) Water absorption is expressed as the weight change of a $2 \times \frac{1}{2} \times \frac{1}{4}$ inch ($50.8 \times 12.7 \times 6.4$ mm) molding which had been post-cured and then immersed in boiling water for 10 hours.

PREPARATIVE METHODS FOR INGREDIENT II

Preparation of Spherical Rubber Powder F and F1

A curable organosiloxane composition of this invention was prepared by adding a quantity of isopropanolic chloroplatinic acid solution equivalent to 20 ppm of platinum based on the total weight of ingredient A to 50 parts of a dimethylvinylsiloxy-terminated dimethylpolysiloxane (ingredient A) having a viscosity of 0.8 Pa.s and maintained at a temperature of $-10°$ C. 18 parts of a methylhydrogenpolysiloxane (ingredient B) having the following structure

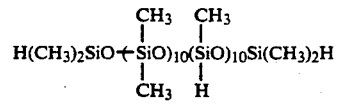

5 parts allyl glycidyl ether (ingredient D), and 2 parts of styrene monomer (ingredient E) were then added. This mixture of ingredients was rapidly blended to form an initial mixture and placed in a colloid mill that had been cooled to 5 degrees Centigrade. A homogeneous emulsion was obtained by the addition to this mixture of a blend of 600 parts ion-exchanged water and 10 parts surfactant (Tergitol(R) TMN-6 from Union Carbide Corporation) that had been cooled to 5 degrees C. Spherical particles of a cured silicone rubber were formed when this emulsion was introduced into stirred water maintained at a temperature of 85 degrees Centigrade.

The resultant particles were isolated, washed with water, dried and then examined under a scanning electron microscope. The particles were found to be perfectly spherical with a particle diameter of 0.1 to 10 microns. This material will be referred to hereinafter as Powder F.

In the comparison example, spherical particles were prepared using the procedure described for particles A with the following modifications: the allyl glycidyl ether (ingredient D) and the styrene monomer (ingredient E) were omitted from the above composition, and only 3 parts of the methylhydrogen-polysiloxane (ingredient B) was added instead of 18 parts. The cured silicone rubber particles were designated Powder F1.

Preparation of Wet-Method Spherical Particles (Powders G and G1)

Powder G was prepared using the same procedure described for Powder F using the following amounts and types of ingredients:

An emulsified curable organosiloxane composition of this invention was prepared by blending to homogeneity 50 parts of a dimethylvinylsiloxy-terminated dimethylpolysiloxane with a viscosity of 0.2 Pa.s (ingredient A), 13 parts trimethylsiloxy-terminated methylhydrogenpolysiloxane with a viscosity of 0.01 Pa.s (ingredient B), 5 parts allyl glycidyl ether (ingredient D), and 5 parts alpha-methylstyrene (ingredient E), an amount of isopropanolic chloroplatinic acid solution equivalent to 20 ppm of platinum based on the total weight of ingredient A, 600 parts ion-exchanged water and 20 parts Tergitol TMN-6 surfactant. Particles of a cured silicone rubber were produced when the emulsion was stirred into water maintained at a temperature of 85 degrees Centigrade. After washing and drying the resultant powder was examined under an electron microscope and was found to consist of spherical particles with a particle diameter of from 0.1 to 8 microns. This product was designated as Powder G.

As a comparison example Powder G[1] was prepared using the same procedure described for Powder G, with the omission of the allyl glycidyl ether (ingredient C) and the alpha-methyl styrene (ingredient D) and the presence of only 3 parts of the methylhydrogen-polysiloxane instead of 13 parts.

Preparation of Irregularly Shaped Particles (Powders H and H[1])

A homogeneous mixture of ingredients A, B, C, D and E of the curable organosiloxane composition used to prepare Powder F was placed in an oven maintained at 100 degrees Centigrade and cured by heating for 1 hour. The cured product was then pulverized in a grinder to yield irregularly shaped particles of a cured silicone rubber. The material passing through a 100-mesh screen was designated Powder H.

A homogeneous mixture of the same ingredients (A, B, and E) used for Powder F[1] was cured by heating the mixture for one hour in an oven maintained at 100 degrees C. The mixture of irregularly shaped cured particles was pulverized as described for Powder H. The material passing through a 100-mesh screen was designated Powder H[1]. Preparation of Dry-Method Spherical Powders I and I[1]

0.1 part 3-methyl-1-butyne-3-ol as a curing reaction inhibitor was blended into the same ingredients A, B, C, D, and E of the curable organosiloxane composition used to prepare Powder G. The resultant composition was cured by spraying it into a spray drier wherein the air temperature was 230 degrees Centigrade. The resultant spherical particles had particle diameters of 1 to 150 microns and are identified as Powder I.

For comparative purposes particles of cured silicone rubber were prepared using ingredients A, B and C of the organosiloxane composition used to prepare Powder G[1]. The composition was cured by introducing it into a spray drier operating under the conditions described for Powder I. The product was designated as Powder I[1].

EXAMPLE 1

A curable resin composition of this invention was prepared by blending the following ingredients to homogeneity using a roller mill heated to a temperature of 90 degrees C.:

31 Parts of a phenol novolac resin having a softening point of 80 degrees Centigrade and a hydroxyl group equivalent weight of 100, 8 parts of Powder F, 69 parts fused quartz powder, 4 parts hexamethylenetetramine, and 1 part carnauba wax.

The resultant mixture was pulverized to yield a thermosetting phenol novolac resin composition (sample 1). This resin composition was then transfer molded at a temperature of 175° C. for 3 minutes under a pressure of 70 Kg/cm2, followed by a 2-hour post-cure at 150 degrees Centigrade.

The various properties of this molding are reported in Table 1.

For purposes of comparison moldings were similarly prepared as above, either using 8 parts Powder F[1] in place of Powder F of Example 1 (comparative sample 1) or without the addition of any cured silicone rubber particles (comparative sample 2). The properties of these three moldings were measured, and the results are reported in Table 1.

TABLE 1

| Ingredients and Properties | Sample 1 | Comparative Samples 1 | 2 |
|---|---|---|---|
| (i) phenol novolac resin (parts) | 30 | 30 | 30 |
| (ii) Powder F (parts) | 12 | — | — |
| Powder F[1] (parts) | — | 12 | — |
| mold shrinkage (%) | 0.05 | 0.07 | 0.27 |
| spiral flow (inches) | 28 | 21 | 26 |
| flexural modulus (kg/mm2) | 820 | 930 | 1450 |
| thermal expansion coefficient ($\times 10^5$/°C.) | 0.2 | 0.3 | 1.4 |
| SEM observation of gaps | absent | present | NE |
| water absorption (%) | 0.43 | 0.52 | 0.32 |

NE = Not Evaluated

EXAMPLE 2

The following ingredients were blended on a roll mill heated to 90 degrees C.:

13 parts of a cresol novolac epoxy resin having a softening point of 80 degrees C. and an epoxy equivalent weight of 220, 7 parts of the phenol novolac resin described in Example 1,
20 parts of Powder G,
80 parts fused silica,
0.5 parts carnauba wax, and
0.1 part 2-methylimidazole.

Pulverization of the resultant mixture yielded a thermosetting epoxy resin composition of this invention. This resin composition was transfer molded at 175 degrees Centigrade for 2 minutes under a pressure of 70 kg/cm$^2$, and post-cured for 2 hours at 180 degrees Centigrade. The properties of the molding (sample 2) are reported in Table 2.

In the comparative examples, moldings were prepared using the procedure described in the first portion of this example, using either (1) a composition which contained 20 parts of Powder G$^1$ in place of Powder G (comparative sample 3) or (2) a composition which did not contain any cured silicone rubber (comparative sample 4). The properties of the cured moldings are reported in Table 2.

TABLE 2

| ingredients and properties | Sample 2 | Comparative Samples 3 | Comparative Samples 4 |
|---|---|---|---|
| (i) cresol novolac epoxy resin (parts) | 13 | 13 | 13 |
| phenol novolac resin (parts) | 7 | 7 | 7 |
| (ii) Powder G (parts) | 20 | — | — |
| Powder G$^1$ (parts) | — | 20 | — |
| mold shrinkage (%) | 0.13 | 0.15 | 0.39 |
| spiral flow (inches) | 18 | 14 | 15 |
| flexural modulus (kg/mm$^2$) | 750 | 870 | 1580 |
| thermal expansion coefficient ($\times 10^5$/°C.) | 1.0 | 1.4 | 1.7 |
| SEM observation of gaps | absent | present | — |
| water absorption (%) | 0.31 | 0.43 | 0.24 |

EXAMPLE 3

A curable resin composition of this invention was prepared by blending the following ingredients to homogeneity of a roll mill heated to a temperature of 90° C.:

10 parts of Powder H,
74 parts fused silica powder,
0.10 parts aluminum acetylacetonate,
1 part carnauba wax,
13 parts methylphenylpolysiloxane resin containing 5 weight percent of silicon-bonded hydroxyl groups, 40 mole percent CH$_3$SiO$_{1.5}$ units, 10 mole % C$_6$H$_5$(CH$_3$)SiO units, 40 mole % C$_6$H$_5$SiO$_{1.5}$ units, and 10 mole % (C$_6$H$_5$)$_2$SiO units), and 13 parts cresol novolac epoxy resin having a softening point of 80° C. and an epoxy equivalent weight of 220.

The resultant mixture was removed from the mill and pulverized to yield a thermosetting silicone-epoxy resin composition of this invention. This resin composition was transfer molded at 175 degrees Centigrade for 2 minutes under a pressure of 70 kg/cm$^2$, and then post-cured for 12 hours at 180 degrees Centigrade. The various properties of the molding (Sample 3) were measured, and these results are reported in Table 3.

In the comparison examples, moldings were prepared using the same formulation described in the first part of this example, with the exception that one of the compositions (Comparative Sample 5) contained 10 parts of Powder H$^1$ in place of Powder H and the second composition (Comparative Sample 6) did not contain any cured silicone rubber. The properties of the cured moldings are reported in Table 3.

TABLE 3

| Ingredients and properties | Sample 3 | Comparative Samples 5 | Comparative Samples 6 |
|---|---|---|---|
| (i) silicone resin (parts) | 13 | 13 | 13 |
| epoxy resin (parts) | 13 | 13 | 13 |
| (ii) Powder H (parts) | 10 | — | — |
| Powder H$^1$ (parts) | — | 10 | — |
| mold shrinkage (%) | 0.26 | 0.32 | 0.45 |
| spiral flow (inches) | 27 | 21 | 28 |
| flexural modulus (kg/mm$^2$) | 820 | 870 | 1480 |
| thermal expansion coefficient ($\times 10^5$/°C.) | 1.7 | 1.9 | 2.7 |
| SEM observation of gaps | absent | present | NE |
| water absorption (%) | 0.38 | 0.49 | 0.39 |

NE = Not Evaluated

EXAMPLE 4

The following ingredients were blended to homogeneity into 30 parts thermosetting polyimide resin (BT2480 from Mitsubishi Gas Chemical Co., Ltd.) using a roller mill heated to a temperature of 90° C.:

6 parts Powder I,
70 parts fused silica powder,
1 part carnauba wax, and
0.32 parts aluminum benzoate.

The resultant mixture was removed from the mill and pulverized to yield a thermosetting polyimide resin composition of this invention. This composition was transferred molded at 220 degrees Centigrade/4 minutes/70 kg/cm$^2$, and then post-cured at 230 degrees Centigrade for 3 hours. The various properties of this molding (Sample 4) were measured, and these results are reported in Table 4.

In the comparison examples, molding was conducted under the same conditions as described in the first part of this example, but using (1) a composition containing 6 parts of Powder I$^1$ in place of Powder I (Comparative Sample 7) and (2) a composition which contained no cured silicone rubber (Comparative Sample 8). The spiral flow, presence or absence of gaps on the SEM micrograph, and water absorption were measured, and these results are reported in Table 4.

TABLE 4

| Ingredients and Properties | Sample 4 | Comparative Samples 7 | Comparative Samples 8 |
|---|---|---|---|
| (i) polyimide resin (parts) | 30 | 30 | 30 |
| (ii) Powder I (parts) | 6 | — | — |
| Powder I$^1$ (parts) | — | 6 | — |
| spiral flow (inches) | 45 | 35 | 38 |
| SEM observation of gaps | absent | present | — |
| water absorption (%) | 0.45 | 0.52 | 0.43 |

The curable resin compositions of the present invention comprise a curable resin and either spherical or irregularly shaped particles of a cured silicone rubber prepared from an organosiloxane composition that is curable by a hydrosilylation reaction. The characterizing feature of the organosiloxane composition is the presence of reaction products of an organohydrogenpolysiloxane with 1) an aliphatically unsaturated epoxide compound and 2) an aliphatically unsaturated aromatic hydrocarbon. The reaction products can be formed in situ or prior to addition of the epoxide compound and/or the aromatic hydrocarbon compound to the other ingredients of the curable organosiloxane composition.

That which is claimed is

1. In an improved curable resin composition comprising (I) 100 parts by weight of a curable resin selected from the group consisting of phenolic resins, formaldehyde resins, xylene resins, furan resins, urea resins, imide resins, melamine resins, alkyd resins, aniline resins, sulfonamide resins, silicone resins, epoxy resins, and copolymers obtained by reacting two or more of these resins, and (II) from 0.1 to 100 parts by weight of uniformly dispersed, finely divided particles of a cured silicone rubber exhibiting a particle diameter not exceeding 1 millimeter, where said particles are obtained by curing an organosiloxane composition comprising (A) 100 parts by weight of an organopolysiloxane having at least two silicon-bonded lower alkenyl groups in each molecule, (B) from 0.3 to 100 parts by weight of an organohydrogenpolysiloxane having at least two silicon-bonded hydrogen atoms in each molecule, and (C) an amount of a platinum-containing catalyst sufficient to promote curing of said silicone rubber, the improvement comprising the presence in the curable organosiloxane composition of either (1) from 0.1 to 50 parts by weight of (D) an aliphatically unsaturated epoxide compound or a reaction product of from 0.1 to 50 parts by weight of said epoxide compound with a quantity of said organohydrogenpolysiloxane in excess of that required to react with said organopolysiloxane; and from 0.1 to 100 parts by weight of (E) an aromatic hydrocarbon containing at least one aliphatically unsaturated group per molecule or a reaction product of said aromatic hydrocarbon with a quantity of said organohydrogenpolysiloxane in excess of that required to react with said organopolysiloxane, or (2) a reaction product of from 0.1 to 50 parts by weight of said epoxide compound and from 0.1 to 100 parts by weight of said aromatic hydrocarbon with a quantity of said organohydrogenpolysiloxane in excess of that required to react with said organopolysiloxane.

2. A curable resin composition according to claim 1 where the viscosity of ingredient A is from 0.05 to 100 Pa.s at 25° C., the viscosity of ingredient B is from 0.001 to 10 Pa.s, the concentration of ingredient C is equivalent to from 0.1 to 1000 parts of platinum metal per million parts by weight of ingredient A, ingredient D is allyl glycidyl ether, vinylcyclohexene monoxide, glycidyl acrylate, glycidyl methacrylate,

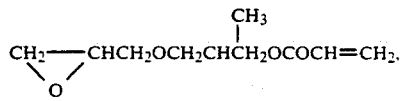

-continued

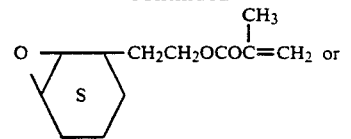

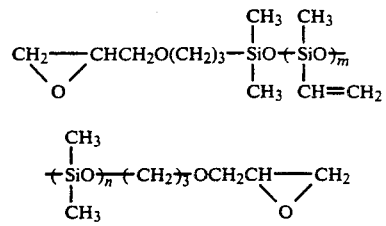

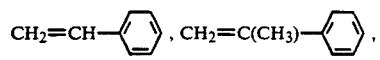

where m and n are positive integers, ingredient E is

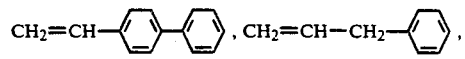

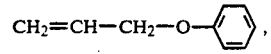

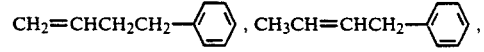

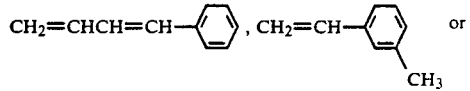

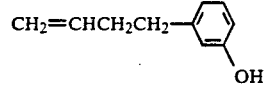

the diameter of said microparticulate silicone rubber is less than 300 microns, and the concentration of said microparticulate silicone rubber in said curable resin composition is from 0.5 to 70 parts.

3. A composition according to claim 2 where said resin is a phenolic, imide, epoxy, or a silicone resin, the viscosity of ingredient A is from 0.05 to 10 Pa.s, the hydrocarbon radicals of ingredient A are methyl and vinyl, the concentration of ingredient B is from 0.3 to 100 parts by weight per 100 parts of ingredient A, the organosiloxane composition contains a filler, the concentration of ingredient C is equivalent to from 0.5 to 200 parts by weight per one million parts by weight of ingredient A, and the diameter of the cured silicone rubber particles does not exceed 50 microns.

4. A composition according to claim 3 where ingredient A is a dimethylvinylsiloxy-terminated dimethylpolysiloxane, ingredient B is a methylhydrogenpolysiloxane, ingredient C is chloroplatinic acid, and prior to being added to said organosiloxane composition at least one of said epoxy compound and said aromatic compound at prereacted with a portion of the silicon-bonded hydrogen atoms present in the organohydrogenpolysiloxane.

* * * * *